United States Patent [19]

Vermeulen et al.

[11] 4,252,282
[45] Feb. 24, 1981

[54] DOUBLE-ROLL CRUSHER

[75] Inventors: Eric Vermeulen, Grimbergen; Gustave van Bogaert, Westerlo, both of Belgium

[73] Assignee: PB Gelatines, Brussels, Belgium

[21] Appl. No.: 44,285

[22] Filed: May 31, 1979

[30] Foreign Application Priority Data

May 31, 1978 [FR] France ............................... 78 16164

[51] Int. Cl.³ ............................................. B02C 18/18
[52] U.S. Cl. ....................................... 241/236; 83/835
[58] Field of Search ................. 241/236, 30; 83/835

[56] References Cited

U.S. PATENT DOCUMENTS

| | | | |
|---|---|---|---|
| 744,296 | 11/1903 | Condula | 241/236 |
| 3,201,066 | 8/1965 | Danforth | 241/236 X |
| 3,240,436 | 3/1966 | Mylting | 241/236 X |
| 3,991,944 | 11/1976 | Balkoff | 241/236 X |

FOREIGN PATENT DOCUMENTS

| | | |
|---|---|---|
| 525166 | 5/1931 | Fed. Rep. of Germany . |
| 2347354 | 9/1973 | Fed. Rep. of Germany . |
| 2538174 | 8/1975 | Fed. Rep. of Germany . |
| 2312293 | 8/1976 | France . |
| 1454288 | 11/1976 | United Kingdom . |

*Primary Examiner*—Howard N. Goldberg
*Attorney, Agent, or Firm*—Millen & White

[57] ABSTRACT

An improved double-roll crusher is provided which is especially suitable for crushing bones having a relatively low content of soft matter, the crusher being of the general type comprising two parallel rolls, each comprising an assembly of alternating toothed cutting discs and spacers so disposed that cutting discs on one roll extend radially into the spaces between adjacent cutting discs on the opposing roll in an alternating manner, wherein the improvement comprises forming the toothed cutting discs so that the gap between adjacent teeth is trapezium-shaped, the sides of the teeth make a rake angle of 1°–20°, the upper face of each tooth is beveled 5°–35°, and the length of the larger base of the trapezium is close to the maximum desired particle size.

13 Claims, 6 Drawing Figures

DOUBLE-ROLL CRUSHER

BACKGROUND OF THE INVENTION

The present invention relates to an improved double-roll crusher for crushing fatty bones used to obtain rendered bones of low fat content suitable for the production therefrom of gelatin and also glue or animal meal.

Fatty bones are obtained from slaughter houses or as waste from butcher shops. Bones from such sources are often associated with meat and fat. They cannot be used as such for the production of gelatin. Usually they are treated in order to take off the major part of the fat and to obtain the desired granulometry. Most often fatty bones are first sorted to eliminate foreign substances such as pieces of iron or plastic material and they are afterwards sent to a prebreaker and a crusher. The crushed bones are then heated by steam to a temperature of about 90° to 95° C. and charged in a press in order to recover a solid cake consisting largely of bone and a liquid consisting of molten fats, water soluble substances and in some cases bone powder and other proteinous substances. The rendered bones are then dried and introduced into a unit for the preparation of gelatin.

The crushing is intended to reduce bones to a particle size or granulometry suitable for producing gelatin and for obtaining a good separation of noncollagenous proteinous material during the rendering in a press. This granulometry usually ranges between 3 and 18 mm. Furthermore the crushed product must not contain more than a small proportion of powder. This bone powder has a tendency to clog the rendering press and cannot be used for the production of gelatin. Therefore it is necessary to separate the bone powder before the gelatin production step, thereby producing a byproduct which can be used as meat meal, but has a low price because it has a low albumin content. Furthermore, the granulometry must not exceed the highest granulometry acceptable for the acid treatment of the bones in gelatin production. Moreover, since the size of the press outlet is close to the maximum particle size of bones acceptable for the acid treatment in gelatin production, excessively large bone particles are liable to block up the press.

OBJECTS OF THE INVENTION

Accordingly, one object of the present invention is to provide an improved double-roll crusher suitable for crushing bones to produce particles of a precise, homogeneous granulometry.

Another object of the invention is to provide an improved double-roll crusher suitable for crushing bones with a minimum of powder production.

A further object of the invention is to provide an improved double-roll crusher suitable for crushing bones having a low content of soft matter.

Upon further study of the specification and appended claims, further objects and advantages of this invention will become apparent to those skilled in the art.

SUMMARY OF THE INVENTION

Briefly, these objects of the invention may be attained by providing, in a double-roll crusher comprising two rolls having parallel axes and rotating in opposite directions, each roll comprising an assembly of alternating toothed cutting discs and spacers or spacer portions so disposed that cutting discs on one roll extend radially into the spaces between adjacent cutting discs on the opposing roll in an alternating manner, the improvement comprising said toothed cutting discs being so shaped that the gap between adjacent teeth on a disc has the shape substantially of a trapezium, the smaller base of which is defined by the bottom of the gap on the inner part of the toothed portion of the disc, the larger base of which is at the periphery of the disc, and the lateral sides of which, defined by the adjacent sides of adjacent teeth, make a rake angle $\alpha$ of from 1° to 20°; wherein the upper face of each tooth is flat and is beveled downwardly and rearwardly with respect to the direction of rotation of the roll at an angle of drive $\beta$ of from 5° to 35° with respect to the tangent to the roll; and wherein the length of the larger base is substantially equal to the maximum desired dimension of the resultant crushed bone particles.

DETAILED DISCUSSION

It has been found that the crusher of the invention makes it possible to crush bones containing less than 20% of soft matter, i.e., meat, fats and the like, to such a granulometry that there are substantially no particles of bone having a size greater than 16 mm, and less than 10% of particles having a size less than 3 mm.

The crusher of the invention has a large capacity. A crusher having outer dimensions of 90 cm × 130 cm fed with particles having a granulometry not exceeding 40 mm issuing from a prebreaker can treat 7 tons per hour of fatty bones. The crusher of the invention also has the advantage of being self-cleaning, thus avoiding stoppage for cleaning. Moreover, the crusher is very selective for bones and does not shred skins present in the bones. Their separation is therefore easier.

A better understanding of the invention may be obtained from a further description of certain embodiments, and with reference to the drawings. These embodiments are merely illustrative and not limitative of the scope of the invention.

Figure 1:
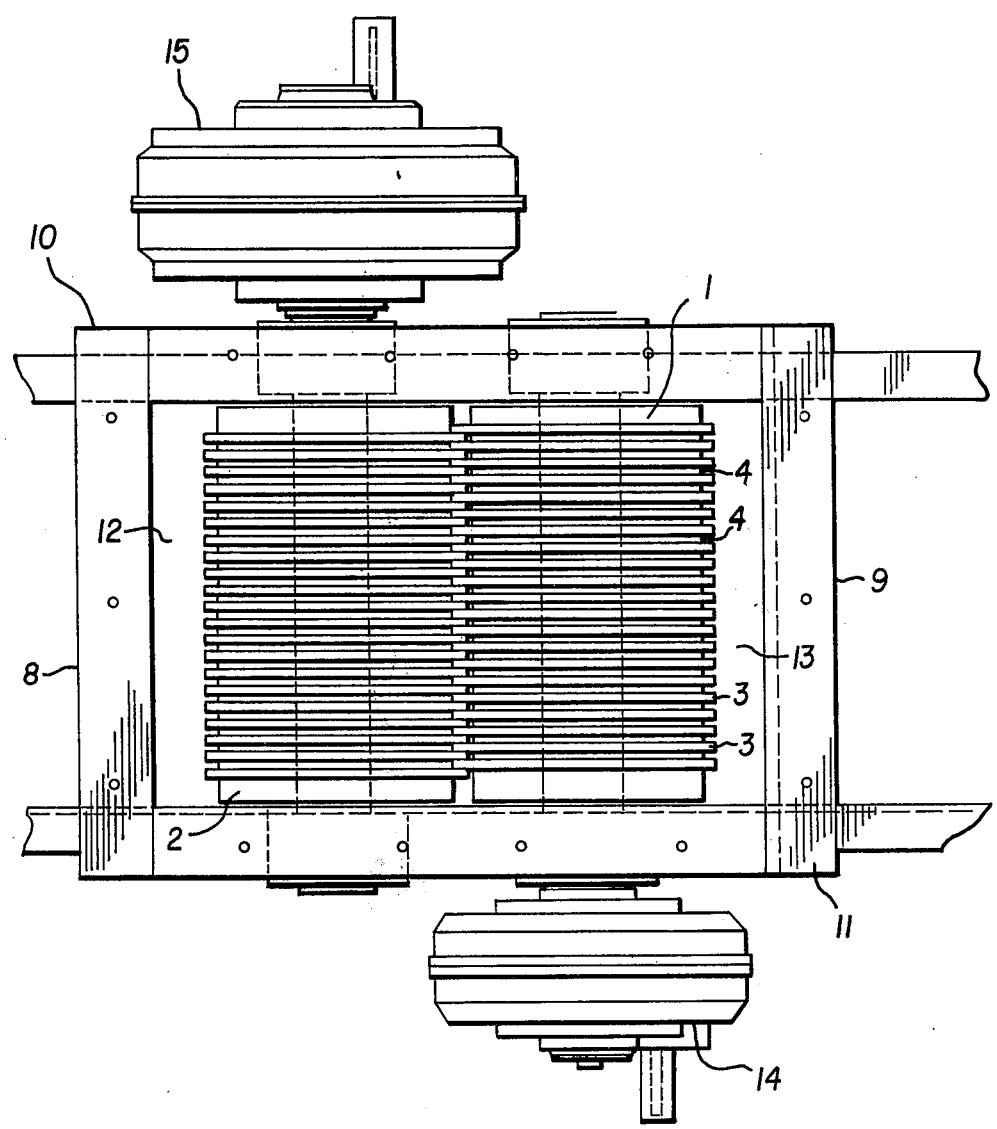
FIG. 1 is a side elevation of a crusher according to the invention.

As illustrated in FIG. 1, the crusher comprises two cylindrical rolls (1 and 2) having parallel axes disposed in the same horizontal plane. The two rolls are set in a housing. According to the embodiment illustrated in FIG. 1, the housing comprises two side plates (8 and 9) and front and rear plates (10 and 11). The spaces (12 and 13) between the rolls (1 and 2) and the side plates (8 and 9) are sufficient to allow substances adhering to the rolls to be recirculated. In a crusher having a 90×130 cm housing, these spaces are about 8 cm wide. Each roll is coupled with a drive motor (14 and 15) fitted with a speed-reducing gear in order to control the speed of rotation. The speeds of rotation of opposing crusher rolls (1 and 2) are normally different, and preferably in a ratio of from 1.2 to 2. The speed of rotation of the slower roll is preferably in the range of about 100 to 150 rpm.

Each roll is made from a plurality of discs stacked one on top of another. According to the embodiment shown in FIGS. 4 and 6, each disc comprises a protruding part bearing teeth (3) and a recessed part of smaller diameter and slightly thicker than the toothed part forming the spacer (4). In an alternative embodiment (not shown), the rolls are made by alternately stacking discs bearing peripheral teeth and spacer discs having a smaller diameter and a slightly greater thickness than the toothed discs.

The teeth each have four lateral faces. Two of these faces are parallel to each other and perpendicular to the axis of the roll. The two other faces are symmetrically inclined so that the gap between adjacent teeth on the same disc has the shape substantially of a trapezium, the smaller base of which is defined by the bottom of the gap on the inner part of the toothed portion of the disc and the larger base of which is at the periphery of the disc and defined by the back edge of the top of each tooth and the front edge of the top of the nearest adjacent tooth. The size of the large base is substantially equal to the maximum desired dimension of the resultant crushed bone particles, and is preferably between 15 and 20 mm. The two lateral sides of the trapezium which are defined by the adjacent sides of adjacent teeth make a rake angle $\alpha$ ranging between 1° and 20°. Smaller angles are used for crushing bones containing a higher proportion of soft matter, e.g., meat, skins. Angles lower than 1° impair the mechanical stability of the device.

Figure 2:
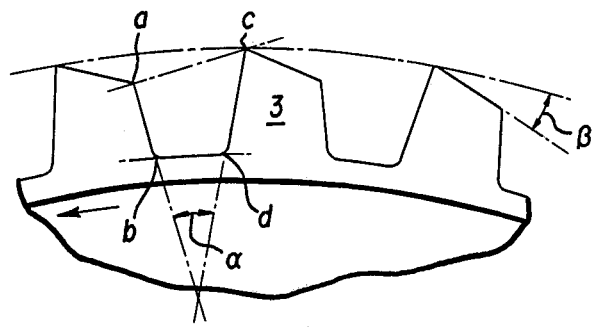
FIG. 2 is a partial cross sectional view of one of the cutting discs showing the shape of the teeth and the gaps therebetween.

Referring to FIG. 2, the trapezium-shaped gap between adjacent teeth, abdc, is defined by the lateral sides of adjacent teeth, ab and cd, the bottom of the gap, bd (the corners optionally being rounded off), forming the shorter base of the trapezium, and the line joining the tops of adjacent lateral sides, ac, forming the larger base or top of the trapezium. The top of each tooth is flat and is beveled downwardly and rearwardly with respect to the direction of rotation of the roll. The angle of drive $\beta$ between the inclined plane of the bevel and the tangent to the roll ranges between 5° and 35°, the value of $\beta$ being preferably about 20°.

The presence of this bevel is especially important in avoiding rejection of round-shaped parts of bones such as the ball end of a ball and socket joint. For angles greater than 35°, the bones are not hooked by the teeth. The height of the teeth is preferably close to, or substantially equal to, the length of the larger base of the trapezium. The thickness of the spacer discs or spacer portion of combined cutter-spacer discs is also close to, or substantially equal to, this length.

The toothed cutting discs of each roll are so disposed that they extend radially into the spaces formed by the spacer discs or portions and adjacent toothed cutting discs of the opposing roll, in an alternating manner.

Figure 3:
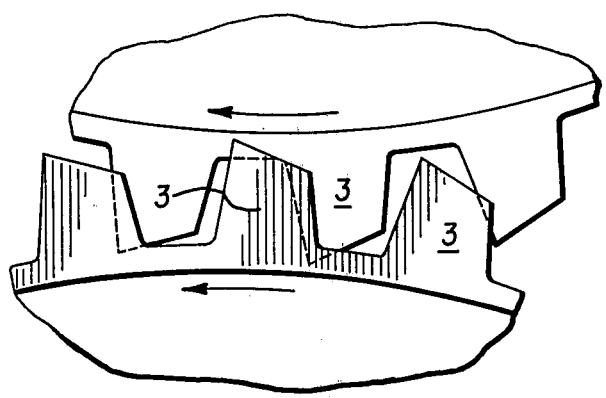
FIGS. 3 and 5 are diametric cross-sectional views of the rolls showing engagement of the teeth.
Figure 5:
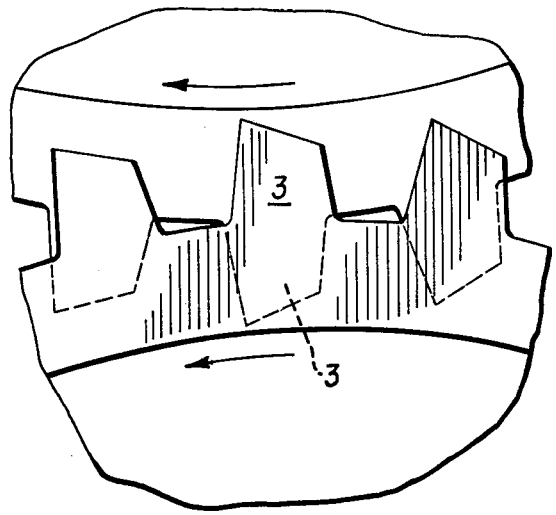
Figure 4:
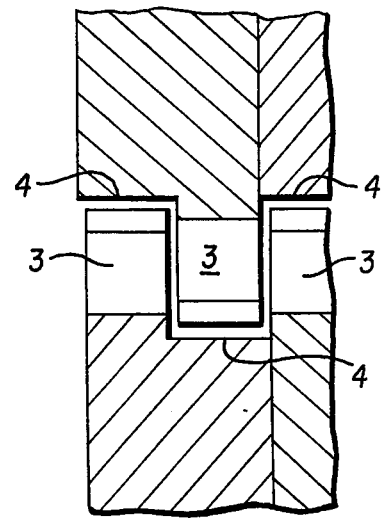
FIGS. 4 and 6 are partial side elevations also showing the engagement of the teeth.
Figure 6:
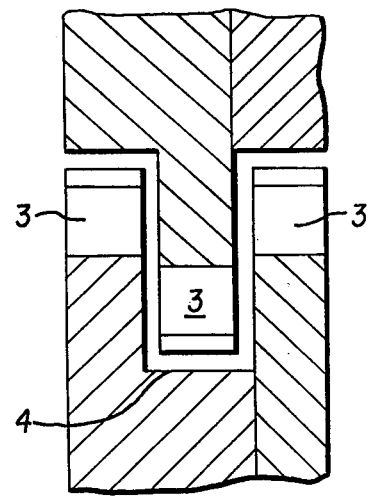

The depth of engagement or interpenetration of the toothed cutting discs of opposing rolls may vary between interpenetration only to the extent of about the height of the teeth, as shown schematically in FIGS. 3 and 4, and interpenetration to about double the height of the teeth, so that the bottoms of the gaps between teeth on opposing rolls are substantially parallel at the point of closest approach, as shown in FIGS. 5 and 6.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a double-roll crusher comprising two rolls having parallel axes and rotating in opposite directions, each roll comprising a plurality of alternating toothed cutting discs and spacers so disposed that cutting discs on one roll extend radially into the spaces between adjacent cutting discs on the opposing roll in an alternating manner, the improvement which comprises:

said toothed cutting discs having a plurality of radially disposed teeth separated by a plurality of gaps therebetween, said teeth being capable of seizing and crushing bones having a low content of soft matter; wherein each tooth has four flat lateral sides, two of which are parallel to each other and perpendicular to the axis of the roll, the other two of which being inclined, each said tooth having a flat upper face having a front edge and a back edge, said upper face being beveled downwardly and rearwardly with respect to the direction of rotation of the roll at an angle of drive of from 5° to 35° with respect to the tangent to the roll, whereby round-shaped parts of bones are hooked by said teeth; and wherein the uniform cross-section of each said gap has the shape substantially of a trapezium having a base, two opposite lateral sides and a top larger than the base, the base being defined by the bottom of the gap on the inner part of the toothed portion of the disc, the lateral sides being defined by the inclined adjacent sides of adjacent teeth, said lateral sides making a rake angle of from 1° to 20°, and the top being defined by a straight line joining the tops of said lateral sides and corresponding to the distance between the back edge of each tooth and the front edge of the nearest adjacent tooth, said distance being substantially equal to a desired maximum dimension of crushed bone particles.

2. The crusher of claim 1, wherein the angle of drive $\beta$ is about 20°.

3. The crusher of claim 2, wherein the top of the trapezium-shaped gap is from about 15 mm to about 20 mm in length; and the height of the teeth and the width of the spacers between adjacent toothed cutting discs on each roll are each substantially equal to the length of the top of the trapezium-shaped gap.

4. The crusher of claim 1, wherein the top base of the trapezium-shaped gap is from about 15 mm to about 20 mm in length.

5. The crusher of claim 1, wherein the height of the teeth is substantially equal to the length of the top of the trapezium-shaped gap.

6. The crusher of claim 1, wherein the width of the spacers between adjacent toothed cutting discs on each roll is substantially equal to the length of the top of the trapezium-shaped gap.

7. In a method of crushing bones having a low content of soft matter, which method comprises crushing the bones in a double-roll crusher comprising two rolls having parallel axes and rotating in opposite directions, each roll comprising an assembly of alternating toothed cutting discs and spacers so disposed that cutting discs on one roll extend radially into the spaces between adjacent cutting discs on the opposing roll in an alternating manner, the improvement which comprises:

said toothed cutting discs having a plurality of radially disposed teeth separated by a plurality of gaps therebetween, said teeth being capable of seizing and crushing bones having a low content of soft matter; wherein each tooth has four flat lateral sides, two of which are parallel to each other and perpendicular to the axis of the roll, the other two of which being inclined, each said tooth having a flat upper face having a front edge and a back edge, said upper face being beveled downwardly and rearwardly with respect to the direction of rotation of the roll at an angle of drive of from 5° to 35° with respect to the tangent to the roll, whereby round-shaped parts of bones are hooked by said teeth; and wherein the uniform cross-section of each said gap has the shape substantially of a trapezium having a base, two opposite lateral sides and a top larger than the base, the base being defined by the bottom of the gap on the inner part of the toothed portion of the disc, the lateral sides being defined by the inclined adjacent sides of adjacent teeth, said lateral sides making a rake angle of from 1° to 20°, and the top being defined by a straight line joining the tops of said lateral sides and corresponding to the distance between the back edge of each tooth and the front edge of the nearest adjacent tooth, said distance being substantially equal to of the resultant crushed bone particles; whereby the bones are crushed without shredding any skin associated therewith.

8. The method of claim 7, wherein the angle of drive is about 20°; the top of the trapezium-shaped gap is from about 15 mm to about 20 mm in length; and the height of the teeth and the width of the spacers between adjacent toothed cutting discs on each roll are each substantially equal to the length of the top of the trapezium-shaped gap.

9. The method of claim 8, wherein the rolls rotate at unequal speeds, the ratio of speeds being from 1.2 to 2, and the speed of the slower roll being from 100 to 150 rpm.

10. The method of claim 9 wherein the bones are first broken in a prebreaker and then crushed.

11. The method of claim 10, wherein said content of soft matter is less than 20%, and the resultant crushed bone contains substantially no particles having a size greater than 16 mm, and less than 10% of particles having a size less than 3 mm.

12. The method of claim 7, wherein the rolls rotate at unequal speeds, the ratio of speeds being from 1.2 to 2.

13. The method of claim 12, wherein the speed of the slower roll is in the range of 100 to 150 rpm.

* * * * *